United States Patent [19]

Biancardi

[11] Patent Number: 4,529,001

[45] Date of Patent: Jul. 16, 1985

[54] PRESSURE CONTROLLED PULSE GENERATOR

[75] Inventor: Osvaldo Biancardi, Buenos Aires, Argentina

[73] Assignee: Williams Instrument Company, Inc., Valencia, Calif.

[21] Appl. No.: 505,797

[22] Filed: Jun. 20, 1983

[51] Int. Cl.³ .......................................... G05D 11/035
[52] U.S. Cl. .................................. 137/100; 137/486; 137/624.15; 137/624.2
[58] Field of Search ................ 137/100, 624.2, 624.13, 137/624.15, 486, 487, 98, 101.19

[56] References Cited

U.S. PATENT DOCUMENTS

| | | | |
|---|---|---|---|
| 2,312,201 | 2/1943 | Thompson et al. | 137/486 |
| 3,340,896 | 9/1967 | Mon et al. | 137/624.13 |
| 4,330,003 | 5/1982 | D'Alonzo | 137/100 |
| 4,370,996 | 2/1983 | Williams | 137/99 |

FOREIGN PATENT DOCUMENTS 624397  7/1961  Canada ................................. 137/98

Primary Examiner—Martin P. Schwadron
Assistant Examiner—Stephen M. Hepperle
Attorney, Agent, or Firm—Lyon & Lyon

[57] ABSTRACT

A fluid controlled and regulated apparatus that has a continuous input signal of variable pressure, a continuous input supply of constant pressure, and a pulsating output signal of variable pressure, that is particularly adapted for, but not limited to, the introduction of odorants into a gas supply system to aid in detecting leaks therein. The apparatus measures the volume of natural gas flowing in a pipeline and converts that measurement into the input signal which controls a plurality of interconnected fluid piston valves to convert the input supply into the output signal. The output signal drives a reciprocating pump in a chemical injector system, which injects an odorant into the natural gas flowing in a pipeline.

18 Claims, 7 Drawing Figures

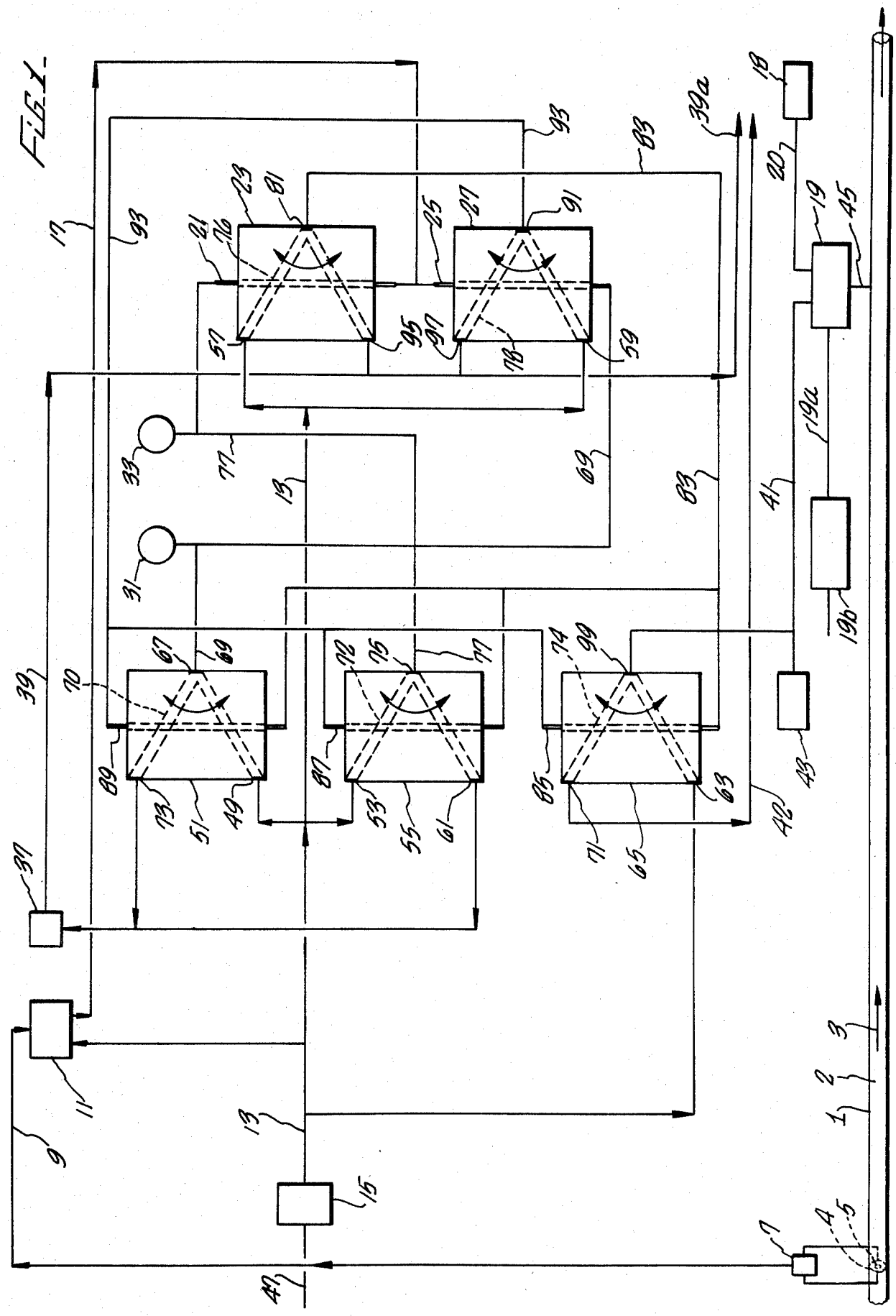

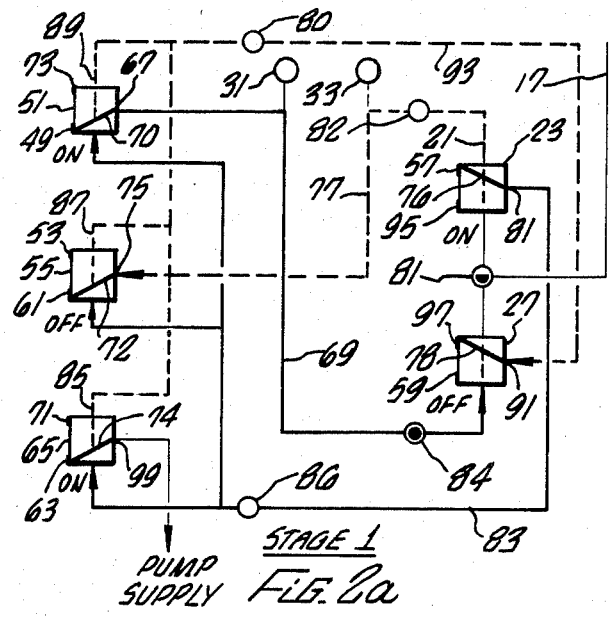
PUMP
SUPPLY  STAGE 1  FIG. 2a
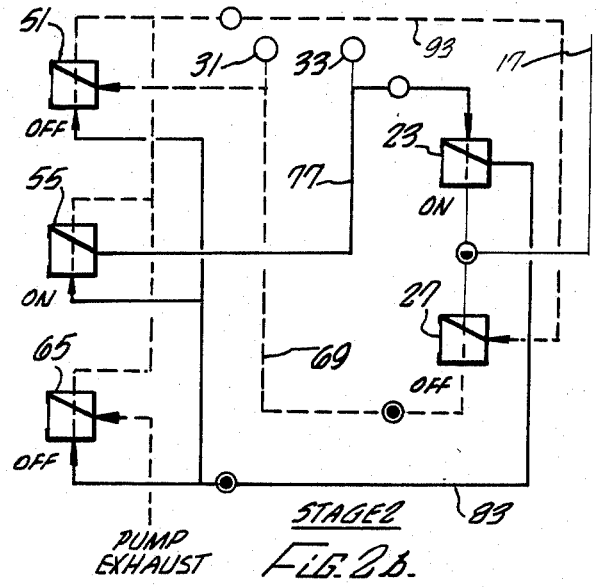
PUMP
EXHAUST  STAGE 2  FIG. 2b
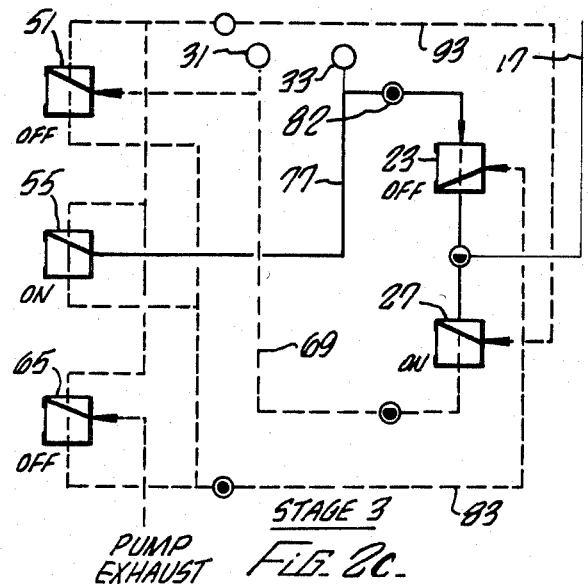
PUMP
EXHAUST  STAGE 3  FIG. 2c
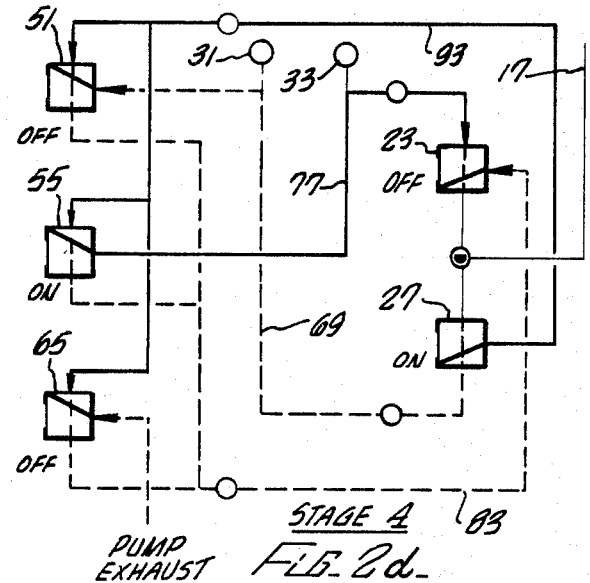
PUMP
EXHAUST  STAGE 4  FIG. 2d
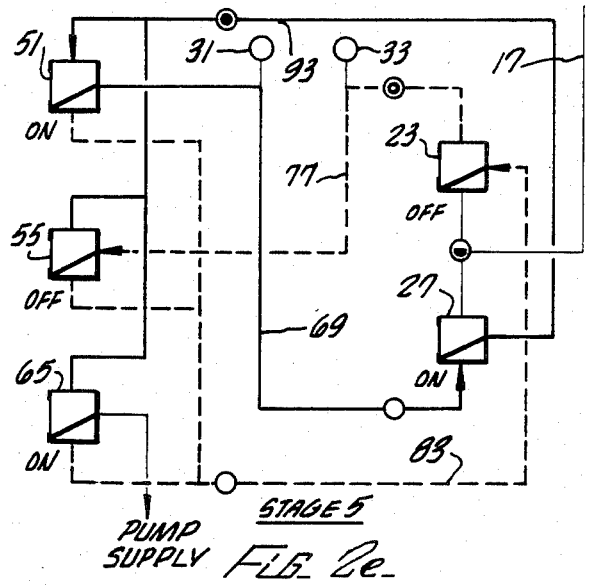
PUMP
SUPPLY  STAGE 5  FIG. 2e
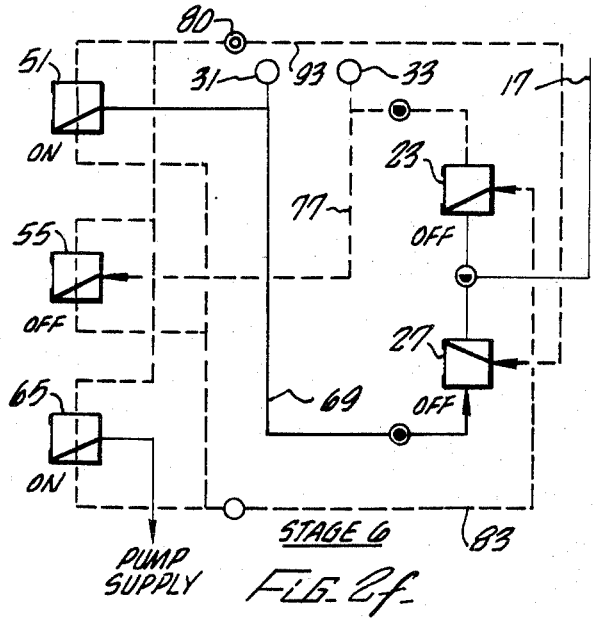
PUMP
SUPPLY  STAGE 6  FIG. 2f

PRESSURE CONTROLLED PULSE GENERATOR

BACKGROUND OF THE INVENTION

Natural gas can be extremely dangerous if uncontained. However, should it escape into the atmosphere its presence frequently will be unknown since natural gas is odorless. Therefore, odorants are injected into the gas to make it odoriferous. Usually this occurs immediately before the gas is transported from one location to another; by pumping the odorant into a natural gas pipeline.

Various devices are presently available to inject odorants or other fluids into a pipeline. Most of these devices inject a volume of odorant into the pipeline independent of the flow rate therein. Since flow rates are not always constant, these devices waste odorant by injecting an excess amount of it into the pipeline.

Others have overcome this inefficiency by monitoring the fluid flow rate in the pipeline and adjusting the amount of fluid injected therein accordingly. These devices are similar in the sense that they are all electronically controlled. Typically, they will have a means for converting the flow rate into a continuous pneumatic signal which is then converted by a flow transducer into a continuous electronic signal. Using a linear integrator transmitter, the continuous electronic signal is converted into a pulsating electronic signal. The pulsating signal controls a solenoid valve which produces a pulsating pneumatic signal. Each pneumatic pulsation is sent to a reciprocating pump which actuates in response to inject a given amount of chemical into the pipeline. However, the use of these devices has not proven entirely satisfactory. They are expensive both because they require costly electronic instrumentation; and because they must be partially or totally encased to reduce the likelihood of a natural gas explosion, a major concern at well sites. Additionally, their use requires a well site source of electricity to be secured and maintained at all times, problematic when the well site is at an offshore or remote inland location.

SUMMARY OF THE INVENTION

Briefly, the invention comprises an orifice plate mounted in a main process flow line, such as a natural gas pipeline. The mathematically determined opening in the orifice plate creates a pressure differential within the flow line that is measured and converted into a continuous fluid input signal which varies in pressure depending on the rate of fluid flow in the flow line by means of a differential pressure transmitter. The input signal controls a plurality of interconnected and cycling fluid piston valves to convert a continuous fluid input supply of constant pressure into a pulsating fluid output signal of constant pressure. The pulsation frequency of the output signal is directly related to the pressure of the input signal. To provide substantial linearity between the pulsation frequency of the output signal and the pressure of the input signal, the device has one or more volume chambers interconnected with the piston valves. The rate at which the invention cycles, and therefore its pulsation frequency, can be adjusted by means of a flow restriction device, such as a needle valve, connected to the outlet port of one or more of the piston valves. The output signal is employed to actuate a controller which in turn actuates a reciprocating pump in a chemical injector system to inject a predetermined amount of an additive, such as an odorent, into the flow line for each output pulsation or the output signal may be used to operate the pump directly. Thus, the present invention eliminates unnecessary waste by economically monitoring the injection of additives into the flow line.

It is a primary objective of this invention to provide an apparatus which monitors the rate of flow of the flowable medium, such as natural gas, and automatically injects therein a precise amount of an additive, such as an odorant.

It is a further objective of this invention to provide a non-electrical apparatus for safely injecting the additive into the flowable medium; especially an explosive flowable medium such as natural gas.

It is a further objective of this invention to provide an apparatus for injecting the additive into the flowable medium which is inexpensive to purchase and operate, extremely dependable and accurate, and can be readily adjusted and repaired by a technician.

DESCRIPTION OF THE DRAWINGS

These and other features, aspects and advantages of the present invention will become better understood with reference to the following description, appended claims, and accompanying drawings where:

FIG. 1 is a schematic diagram of the apparatus.

FIGS. 2a through 2f are partial schematic diagrams similar to FIG. 1 of the apparatus showing the progressive sequence of the dynamic cycling of the various components of the apparatus with the cycle beginning in FIG. 2a and continuing through FIG. 2f and then starting over again with FIG. 2a.

DESCRIPTION OF THE PREFERRED EMBODIMENT

Referring now in detail to the drawings, the structure of the apparatus is shown in FIG. 1. Main process flow line 1 has a gas or other flowable medium 2 flowing in the direction of arrow 3 and the flow line 1 has an orifice plate 4, inserted therein, with a mathematically determined orifice opening 5. The orifice opening 5 creates a differential pressure in the flow line 1 from which the fluid flow rate can be calculated. The differential pressure is measured by a differential pressure transmitter 7 which converts the measurement into a continuous fluid input signal of variable pressure usually in a range between 3 psi and 15 psi, all in a well-known manner and that signal is conventionally used for various purposes.

The input signal communicates through conduit 9 and may be boosted by gain relay 11 before passing further into the apparatus. Gain relay 11 is used if the pressure of the input signal is insufficient or if the pressure variations in the input signal are too small for the apparatus to function properly. The boosted signal exits the gain relay 11 into conduit 17 and is communicated to both piston control rod 21 of piston valve 23 and piston control rod 25 of piston valve 27.

The apparatus has five interconnected and cycling piston valves, each of which is fluid controlled. The basic elements of each piston valve are its inlet port, outlet port, a combination inlet/outlet port and piston control rod. In use, the inlet port, outlet port, inlet/outlet port and both ends of the piston control rod will all be connected to external fluid conduits. The piston valve has an internal fluid passageway which allows either the inlet port or the outlet port to communicate with the inlet/outlet port. The position of the piston control rod determines whether the inlet port or the outlet port communicates with the inlet/outlet port. The piston control rod may be in either one of two positions. Its position is determined by the relative fluid pressures in the two conduits to which it connects. If the piston control rod, and thus the piston valve, is in the "on" position, then the inlet port communicates with the inlet/outlet port. If the piston control rod, and thus the piston valve, is in the "off" position, then the outlet port communicates with the inlet/outlet port.

For example, piston valve 23 has piston control rod 21 connected to conduit 77 on one end and conduit 17 on the other end. Inlet port 57 is connected to conduit 13; outlet port 95 is connected to conduit 39; and inlet/outlet port 81 is connected to conduit 83. In operation, piston valve 23 will be in the "on" position when fluid passageway 76 is directed upward, as viewed in all the Figures, from inlet/outlet port 81 to the outlet port 57 which allows inlet port 57 to communicate with inlet/outlet port 81. Piston valve 23 will be in the "off" position when fluid passageway 76 is directed downward from inlet/outlet port 81 which allows outlet port 95 to communicate with inlet/outlet port 81. Whether piston valve 23 is in the "on" or "off" position depends on the relative fluid pressures in conduits 77 and 17 acting on either end of piston rod 21. Should the pressure in conduit 17 exceed the pressure in conduit 77 the piston rod will be shifted upward and therefor piston valve 23 will be in the "on" position. Should the pressure in conduit 77 exceed the pressure in conduit 17 piston valve 23 will be in the "off" position. When piston valve 23 is in the "on" position the fluid in conduit 83 will be pressurized until it is equal in pressure to the fluid pressure in conduit 13. When piston valve 23 is in the "off" position the fluid in conduit 83 will be depressurized until it is equal in pressure to the fluid pressure in conduit 39 which provides an exhaust for the apparatus, normally to atmosphere.

Referring again to gain relay 11, the gain relay requires a continuous fluid input supply of constant pressure to function properly. This input supply is communicated to gain relay 11 from a pressurized fluid supply, which be of irregular pressure, through conduit 47, pressure regulator 15 and conduit 13. The input supply also is communicated through conduit 13 to inlet port 49 of piston valve 51, inlet port 61 of piston valve 55, inlet port 63 of piston valve 65, inlet port 57 of piston valve 23 and inlet port 59 of piston valve 27. Any one or more of the piston valves may be connected to an alternative input supply independent of gain relay 11 and its input supply should that piston valve require a different input pressure.

Connected to inlet/outlet port 67 of piston valve 51 is conduit 69 which connects to piston control rod 25 of piston valve 27. Also connected to conduit 69 is volume chamber 31. Connected to inlet/outlet port 75 of piston valve 55 is conduit 77 which connects to piston control rod 21 of piston valve 23. Also connected to conduit 77 is volume chamber 33.

Connected to inlet/outlet port 81 of piston valve 23 is conduit 83 which connects to piston control rod 85 of piston valve 65, piston control rod 87 of piston valve 55 and piston control rod 89 of piston valve 51. Connected to inlet/outlet port 91 of piston valve 27 is conduit 93 which connects to piston control rod 85 of piston valve 65, piston control rod 87 of piston valve 55, and piston control rod 89 of piston valve 51.

Each piston valve exhausts, normally to atmosphere, and one or more of these exhausts may be restricted by a flow restriction device. As shown, connected to outlet port 73 of piston valve 51 and outlet port 61 of piston valve 55 is conduit 35. Conduit 35 connects to flow restriction device 37, such as a needle valve, which also connects to conduit 39. Conduit 39 connects to outlet port 95 of piston valve 23 and outlet port 97 of piston valve 27. Conduit 39 provides an exhaust to atmosphere at 39a. Also exhausting to atmosphere is conduit 42 which is connected to outlet port 71 of piston valve 65.

The apparatus produces a pulsating fluid output signal of a frequency dependant on the input signal but of a constant pressure which passes out inlet/outlet port 99 of piston valve 65 and into conduit 41. Conduit 41 is connected to a counter 43, which counts the number of fluid pulsations, and to a chemical injector system 19. The chemical injector system 19 is connected to a supply reservoir 18 of an additive, such as an odorant, through conduit 20 and main process flow line 1 through conduit 45. The output signal actuates the injector system, either through a pump controller device or directly to the reciprocating pump which injects a predetermined amount of the additive into flow line 1 for each cycle. It is preferred that the injector system 19 be of the type disclosed in U.S. Pat. No. 4,370,996 wherein a modified pneumatic controller is adopted to operate either automatically (when no signal is available) or in response to air or gas pulses, as produced by the apparatus of this invention, to in turn supply a controlled supply of pressurized air or gas from line 19a at a constant pressure (preferably 25 psi) regulated by pressure regulator 19b to actuate the injector pump.

The volume chambers 31 and 33, previously referred to, have been found to provide the apparatus with substantial linearity between the pulsation frequency of the output signal and the pressure of the input signal. If not used, the pulsation frequency of the output signal and the pressure of the input signal will vary directly, but not substantially linear.

In operation, the apparatus continually cycles through a series of six stages. Each stage represents a switching of one or more piston valves from the "on" position to the "off" position or vice versa. The next stage commences immediately upon the switching of any piston valve. As previously explained, the switching occurs whenever the pressure in the conduit connected to one side of the piston control rod in a piston valve overcomes the pressure in the conduit connected to the other side of the piston control rod.

What has been arbitrarily chosen as stage 1 is depicted in FIG. 2a. Each of the subsequent stages is respectively depicted in FIGS. 2b through 2f. In FIGS. 2a–f, each piston valve is shown along with the three conduits which connect to the piston valve's inlet/outlet port (one conduit) and piston control rod (two conduits). For example, piston valve 51, has conduit 69 connected to inlet/outlet port 67, conduit 93 connected to one end of piston control rod 89, and conduit 83 connected to the other end of piston control rod 89. Piston valve 51 is in the "on" position since the fluid passageway 70 is directed downward from inlet/outlet port 67 which allows inlet port 49 to communicate with inlet/outlet port 67.

Each conduit shown in FIGS. 2a–f will contain a pressurized fluid that varies in pressure as each cycle proceeds. When fully pressurized the pressure in each conduit will be equal to the pressure of the input signal or the input supply. The pressure of the input supply must always be greater than the pressure of the input signal. Although various pressure levels may be involved in different installations, a common application for this system will involve an input signal varying between 3 psi and 15 psi and the input supply pressure typically would be about 55 psi. When fully depressurized the pressure in each conduit will be equal to the exhaust pressure, which is most normally atmosphere.

To more fully and clearly explain the cycling of the apparatus, the various fluid pressures in the conduits at each stage of the apparatus's cycle is depicted by showing an empty, partially full, or full circle somewhere along the path of the conduit. An empty circle indicates that the conduit is fully depressurized. A full circle indicates that the conduit is fully pressurized. A partially full circle indicates that the conduit is neither fully depressurized nor fully pressurized, but rather is in the process of changing from one condition to the other. Additionally, if a conduit is drawn in a heavy solid line, the conduit is either fully pressurized or is pressurizing. If a conduit is drawn in a dotted line, the conduit is either fully depressurized or is depressurizing. The conduit shown by the light solid line may be pressurizing or depressurizing depending on whether the flow rate in the flow line is increasing or decreasing over time.

For example, in FIG. 2f, since conduit 93 is drawn in a dotted line and circle 80 along its path is full, the conduit is fully pressurized and is depressurizing. Using a similiar analysis, it can be determined that conduit 83 is fully depressurized; conduit 77 is partially depressurized and is depressurizing; conduit 69 is fully pressurized; and conduit 17 may be pressurizing or depressurizing depending on whether the flow rate in flow line 1 is increasing or decreasing over time.

In operation, as the apparatus cycles, the differential pressure transmitter 7 is continually monitoring the flow rate of fluid 2 in the main process flow line 1 by measuring the drop in pressure across the orifice plate 4. A standard differential pressure transmitter is used which produces a continuous fluid input signal of variable pressure that ranges from 3 to 15 psi. The input signal is communicated through conduit 9 to where it enters gain relay 11. A three-gain relay 11 is preferrably used which has been found desirable to provide a sufficient input signal. Gain relay 11 boosts the input signal from 3 to 15 psi to 9 to 45 psi. The boosted input signal is communicated through conduit 17 which is connected to piston control rod 21 of piston valve 23 and piston control rod 25 of piston valve 27.

A second fluid supply that is unregulated is communicated to the apparatus through conduit 47. The fluid supply passes through fluid regulator 15 and into conduit 13 to provide the apparatus with a continuous fluid input supply of constant pressure. An input supply of 55 psi has proven satisfactory for proper functioning of the apparatus. The fluid supply communicates through conduit 13 to the gain relay 11 and to the inlet ports of all five piston valves.

The cycling of the apparatus will now be described. At the start of stage 1, as depicted in FIG. 2a, piston valves 51, 65 and 23 are in the "on" position and piston valves 55 and 27 are in the "off" position. Before starting the detailed description of the operational sequences of FIG. 2, it should be noted that for convenience of illustration of the various conduits, the piston valves 23 and 55 are in the "on" position when their fluid passageway lines (76 and 72) are inclined upwardly (from right to left) because the inlet port is above the outlet port, and the other three piston valves 27, 51 and 65 are in the "on" position when their fluid passageway lines (78, 70 and 74) are inclined donwardly. Conduits 93 and 77 are fully depressurized; conduit 69 is fully pressurized; conduit 83 is fully depressurized and is pressurizing; and conduit 17 may be pressurizing or depressurizing depending on whether the flow rate in flow line 1 is increasing or decreasing over time at a given moment.

The apparatus produces during stage 1 and, as will become apparent, also during stages 5 and 6, a fluid output signal of constant pressure. The output signal communicates a fluid pulsation to the chemical injector system 19 through conduit 41. This causes an injection of an additive, such as an oderant, to be injected into main process flow line 1 through conduit 45. During stages 2, 3 and 4, as will become apparent, the output signal is not produced and the reciprocating pump in chemical injector system 19 is free to exhaust for its return, non-pumping stroke.

The duration of stage 1 is until conduit 83 is sufficiently pressurized from conduit 13 through passageway 76 of piston valve 23 to switch piston valves 65, 55 and 51. Piston valve 65 switches to the "off" position, piston valve 55 switches to an "on" position, and piston valve 51 switches to the "off" position. During stage 2, as depicted in FIG. 2b, conduit 77 and volume chamber 33 are pressurizing by fluid supplied through piston valve 55 and conduit 69 and volume chamber 31 are depressurizing. Stage 2 lasts until the pressure in conduit 77 and volume chamber 33 exceeds the pressure of the boosted input signal in conduit 17 to cause the piston valve 23 to switch to the "off" position, commencing stage 3 as depicted in FIG. 2c. During stage 3 conduit 83 is depressurizing and conduit 69 and volume chamber 31 continue to depressurize. Stage 3 ends when the pressure in conduit 69 and volume chamber 31 is less than the pressure of the boosted input signal in conduit 17. Piston valve 27 then switches to the "on" position.

The duration of stage 3 and, as will become apparent, the duration of stage 6 may be lengthened or shortened by adjusting flow restriction device 37. For example, both of these stages will be lengthened when the flow of the fluid passing through restriction device 37 is further restricted. This in turn lengthens the cycle duration of the apparatus. While the apparatus can be adjusted with flow restriction device 37, substantial linearity (i.e., the cycling of the reciprocating pump in the chemical injector system 19 varies directly with the increase or decrease in the input signal from the differential pressure transmitter 7) of the apparatus is achieved by using volume chambers. Volume chamber 31 is connected to conduit 69 and another volume chamber 33 is connected to conduit 77. The volume chambers may vary in size, but it has been found that a chamber having a volume of 2 in$^3$ provides the apparatus with substantial linearity.

During stage 4, as depicted in FIG. 2d, conduit 93 pressurizes. Stage 5, is depicted in FIG. 2e, begins when the pressure in conduit 93 exceeds the pressure in conduit 83. At this point, piston valve 51 switches to the "on" position; piston valve 55 switches to the "off" position; and piston valve 65 switches to the "on" position. During stage 5 conduit 69 and volume chamber 31 are pressurizing and conduit 77 and volume chamber 33 are depressurizing.

Stage 5 lasts until the pressure in conduit 69 and volume chamber 31 exceeds the pressure of the boosted input signal in conduit 17. Stage 6, as depicted in FIG. 2f, commences when piston valve 27 switches to the "off" position. During stage 6, conduit 93 depressurizes and conduct 77 and volume chamber 33 continue to depressurize. Stage 6 ends when the pressure in conduit 77 and volume chamber 33 is less than the boosted input signal in conduit 17. Piston valve 23 then switches to the "on" position thereby returning the system to the stage 1 position of all of the valves and completing one full cycle.

Stage 1 through stage 6 then repeat, and for each repetition the apparatus cycles once and thereby generates one pulsation which air pulse through piston valve 65 during the period of time that valve 65 is in the "on" position actuates the reciprocating pump in chemical injector system 19 to inject a predetermined volume of chemical additive into the flowable medium 2 in the main process flow line 1.

Various changes and modifications may be made in carrying out the instant invention without departing from the spirit and scope thereof. Insofar as these changes and modifications are within the purview of the appended claims, they are to be considered as part of the invention.

What I claim is:

1. An apparatus for injecting an additive into a flowable medium, said apparatus of the type connected to a means for measuring the flow rate in the flowable medium in which a continuous fluid input signal of variable pressure is produced and, a means for injecting a predetermined volume of the additive into the flowable medium responsive to a pulsating fluid output signal, wherein the improvement comprises, fluid controlled means comprising at least five interconnected fluid piston valves controlled by the input signal which converts a continuous fluid input supply of constant pressure into the pulsating fluid output signal in which the pulsation frequency of the output signal varies directly with the pressure of the input signal.

2. An apparatus as recited in claim 1, wherein the fluid controlled means further comprises a timing means interconnected with the plurality of piston valves to provide substantial linearity between the pressure of the input signal and the pulsation frequency of the output signal.

3. An apparatus as recited in claim 2, further comprising a restriction means which restricts the exhaust from one or more piston valves to control the pulsation frequency of the output signal.

4. An apparatus as recited in claim 1 wherein the flowable medium comprises a combustible gas.

5. An apparatus for injecting an additive into a flowable medium, which comprises:

a means for measuring the flow rate in the flowable medium in which a continuous fluid input signal of variable pressure is produced;

a means fluidly controlled by the input signal which converts a continuous fluid input supply of constant pressure into a pulsating fluid output signal of constant pressure, in which the pulsation frequency of the output signal varies directly with the pressure of the input signal, comprising a plurality of interconnected fluid piston valves, each piston valve having at least three ports wherein one of said ports is an input port, one of said ports is an output port and one of said ports is an input/output port;

a means for restricting the rate of exhaust from the output port of at least one of the piston valves to increase or decrease the pulsation frequency of the output signal; and an injector means connected to at least one of the input/output ports of the plurality of piston valves to inject a predetermined volume of the additive into the flowable medium, responsive to the pulsations of the output signal.

6. An apparatus for injecting an additive into a flowable medium, which comprises:

an orifice plate located in the flowable medium;

a differential pressure transmitter to measure the differential pressure created across the orifice plate and generate a continuous fluid input signal of variable pressure;

at least five interconnected piston valves, controlled by the input signal to convert a continuous fluid input supply of constant pressure into a pulsating fluid output signal of constant pressure in which the pulsation frequency of the output signal varies directly with the pressure of the input signal;

a means for restricting the exhaust from at least one of the plurality of piston valves to control the pulsation frequency of the output signal;

a timing means interconnected with the plurality of piston valves to provide substantial linearity between the pressure of the input signal and the pulsation frequency of the output signal; and a means for injecting a predetermined volume of the additive into the flowable medium responsive to the pulsations of the output signal.

7. An apparatus, as recited in claim 6, further comprising a gain relay connected to the differential pressure transmitter to amplify the input signal.

8. An apparatus, as recited in claim 7, wherein the gain relay amplifies the input signal to create a boosted input signal substantially two-three times greater than the input signal.

9. An apparatus, as recited in claim 8, wherein the timing means is a plurality of volume chambers.

10. An apparatus, as recited in claim 9, wherein the pressure of the input signal varies between substantially 3 to 15 psi and the pulsation frequency of the output signal varies between substantially 1 to 44 strokes per minute.

11. A process for injecting an additive into a flowable medium, which comprises the steps of:

measuring the flow rate of the flowable medium;

producing a continuous fluid input signal of variable pressure directly related to the flow rate of the flowable medium;

converting a continuous fluid input supply of constant pressure into a pulsating fluid output signal of constant pressure by communicating the input supply into a plurality of at least five interconnected fluid piston valves which cycle, each cycle producing one output pulsation, the cycling controlled by the input signal; and injecting a predetermined volume of the additive into the flowable medium for each output pulsation by an injection means responsive to the pulsations of the output signal.

12. An apparatus for operating a fluid-pulse operated additive injection system for a flowable medium with a measuring device producing a variable pressure input signal proportional to the rate of flow, comprising, a plurality of piston valves each having an inlet, an outlet, a combination inlet/outlet, a piston rod shiftable between two positions for selectively connecting said inlet/outlet to either said inlet or said outlet, said piston rod being shifted by fluid pressure, a source of fluid at substantially constant pressure with means communicating that fluid to each said inlet, each outlet having means communicating with atmosphere, means connecting the variable input signal to at least one valve piston rod for shifting same, means connecting at least one valve inlet-outlet to the injection system, means interconnecting the remaining said valve inlet/outlets and piston rods for causing said valves to operate in a predetermined sequence for producing pulses of said constant pressure fluid to said injection system at a frequency proportional to the variable pressure input signal, and at least one fluid flow controlling means connected to at least one said piston valve for effecting the rate of said valve operating sequence.

13. The apparatus of claim 12 in which said fluid flow controlling means includes a volume chamber receiving and discharging fluid as pressure in that interconnecting means increases and decreases, respectively, to prolong the influence of the pressurized fluid in that interconnecting means on at least one connected piston valve.

14. The apparatus of claim 12 in which said fluid flow controlling means includes an adjustable valve for restricting the fluid flow to delay the influence of the pressurized fluid on at least one of the connected piston valves.

15. The apparatus of claim 14 in which said adjustable valve is provided on the means communicating with atmosphere.

16. The apparatus of claim 12 in which at least five piston valves, and three fluid flow rate controlling means are included.

17. The apparatus of claim 12 in which at least five piston valves are included with the piston rods shifted by the difference between the pressures applied to the two piston rod ends, a first and second piston valve each having one rod end connected to said variable pressure input signal and the other end of each connected separately by first and second interconnecting means from the inlet/outlet of the third and fourth piston valves, a volume chamber means in at least one of said first and second interconnecting means functioning as said fluid flow controlling means, the fifth piston valve being the valve having its inlet/outlet connected to the injection system, the inlet/outlet of said first piston valve connected to one piston rod end of each of said third, fourth and fifth piston valves, and the inlet/outlet of the second piston valve connected to the other piston rod end of each of said third, fourth and fifth piston valves.

18. The apparatus of claim 17 in which an adjustable valve means is provided on the outlets of said third and fourth piston valve means for delaying the exhaust to atmosphere therefrom.

* * * * *